Dec. 9, 1941.                J. B. WALKER                2,265,588
                          NUT CRACKING APPARATUS
                          Filed Oct. 6, 1939           2 Sheets-Sheet 1
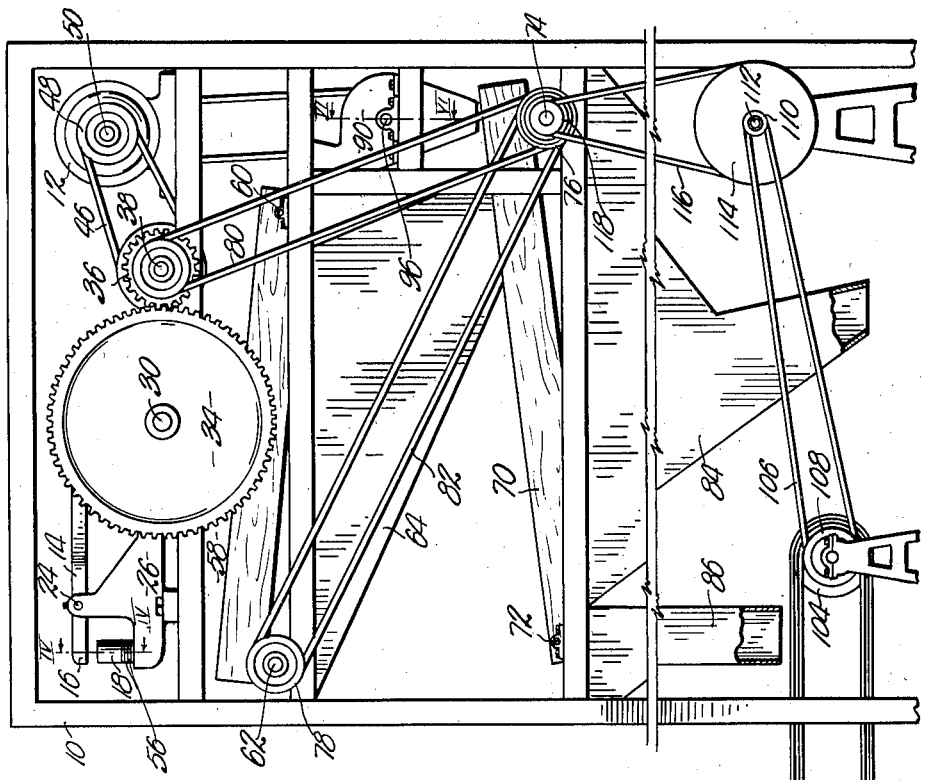
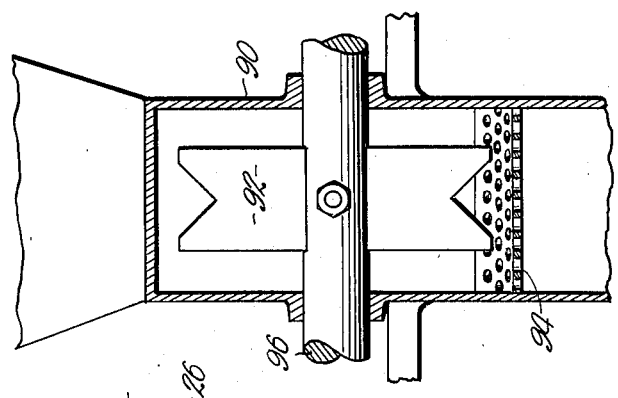
INVENTOR.
James B. Walker
BY
ATTORNEYS Dec. 9, 1941.          J. B. WALKER          2,265,588
                    NUT CRACKING APPARATUS
              Filed Oct. 6, 1939          2 Sheets-Sheet 2
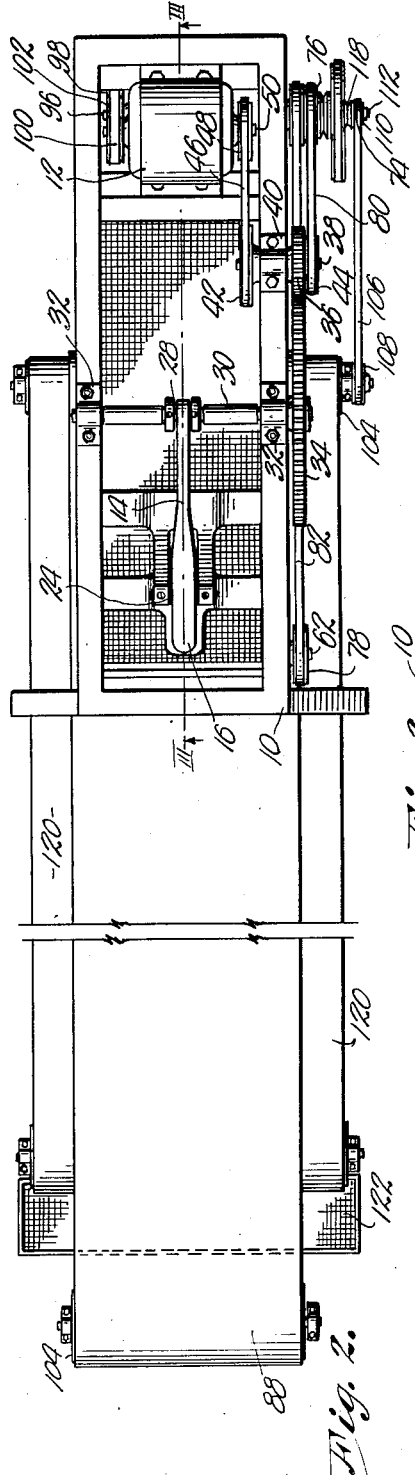
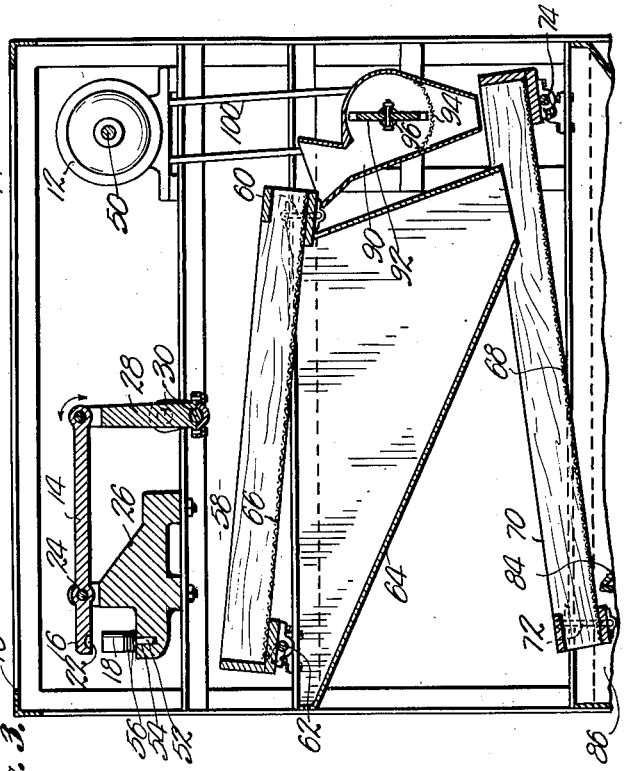
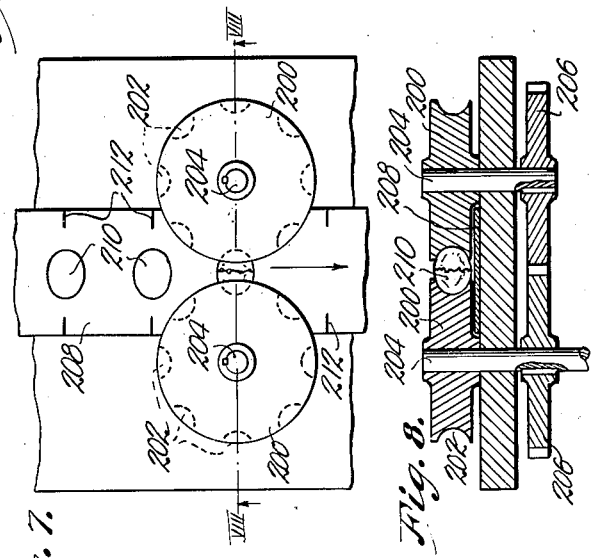
INVENTOR.
James B. Walker
BY
Howy J Hamilton
ATTORNEYS Patented Dec. 9, 1941

2,265,588

UNITED STATES PATENT OFFICE 2,265,588

NUT CRACKING APPARATUS

James B. Walker, Atherton, Mo.

Application October 6, 1939, Serial No. 298,271

3 Claims. (Cl. 146—8)

This invention relates to apparatus for handling and treating nuts so that the kernels thereof may be effectively separated from particles of shells and other foreign matter, and the primary aim is to provide such equipment wherein is embodied unique means for initially crushing the shell of the nut, which is thereafter passed over specially disposed screens to accomplish the desired result.

One of the important aims of the invention is the provision of nut cracking apparatus having at least two specially disposed inclined screens, one of which discharges parts of the crushed nuts above a predetermined size into a device for further shattering the nut shells after the same have been initially broken during the first step through which the nuts are caused to pass.

A still further aim of the instant invention is the provision in a nut cracking apparatus of positive and effective means for crushing the shell of nuts along lines of fracture which will cause the shell to part and release the kernels without reducing said kernels to objectionably small pieces.

Apparatus embodying the preferred form of the invention is made to involve a large number of minor objects and such aims will appear during the course of the following specification, referring to the accompanying drawings wherein:

Figure 1 is a side elevational condensed view of a nut cracking apparatus made in accordance with the present invention.

Fig. 2 is a top plan view of the same.

Fig. 3 is a fragmentary vertical central sectional view taken on line III—III of Fig. 2.

Fig. 4 is an enlarged fragmentary detailed sectional view taken on line IV—IV of Fig. 1.

Fig. 5 is a similar view taken on line V—V of Fig. 4.

Fig. 6 is an enlarged fragmentary sectional view through the second shattering device taken on line VI—VI of Fig. 1.

Fig. 7 is a fragmentary plan view of means for cracking the nut shells, which means is made to embody a modified form of the invention; and, Fig. 8 is a sectional view taken on line VIII—VIII of Fig. 7.

Equipment such as that illustrated and embodying the concepts of this invention is preferably employed in handling nuts having shells that are relatively thick and hard. In commercial practice, a machine made as shown, has been used in cracking black walnuts and when the hereinafter described screens and second shattering devices are arranged as shown in Figs. 1 and 3, the kernels produced are of a size which renders them commercially desirable.

In the drawings, the numeral 10 designates suitable frame work upon which is mounted a motor 12 that is used to operate all the moving parts of the apparatus including a pivotally mounted lever 14, one end of which forms a jaw 16 to cooperate with anvil 18 in crushing the nuts, not shown.

Anvil 18 has a central cavity 20 formed therein in opposed relation to a similar cavity 22 cast or otherwise provided in jaw 16 of lever 14. Lever 14 is pivoted as at 24 to bracket 26, which in turn is mounted upon a portion of frame 10.

While one end of lever 14 serves as the aforementioned jaw 16, the other end thereof is attached to link 28 operatively connected to crank shaft 30, journalled in bearings 32. One end of crank shaft 30 carries a relatively large gear 34 that is in mesh with pinion 36 mounted on shaft 38 journalled in bearing 40. Shaft 38 carries a pulley wheel 42 and a similar wheel 44. Belt 46 passes over pulley wheel 42 and a grooved wheel 48 mounted on shaft 50 of motor 12. Thus, as the motor 12 is operated, jaw 16 will periodically move toward and from anvil 18. The operator places the nuts to be cracked in cavity 20 of anvil 18 when the machine is in operation.

Anvil 18 is adjustable because of the various sizes of nuts that are encountered. Stem 52 carried in socket 54 of bracket 26 allows vertical adjustment of anvil 18, and to rigidly support the latter in a desired set position, a series of slotted washers 56 are used. The employment of such members allows quick setting of anvil 18 by the removal or placement of the desired number of washers or shims 56.

The primary screen, generally designated by the numeral 58, is reciprocably carried at one end thereof by a hanger 60, while the opposite end is mounted upon a crank shaft 62, the rotation of which causes screen 58 to reciprocate above a hopper type means 64 formed as illustrated in Fig. 3, so as to deposit particles passing through the foraminous floor 66 of screen 58 upon the foraminous floor 68 of a second screen 70. Both screens 58 and 70 are inclined and the parts of nuts deposited upon the latter, by means 64, are first presented to screen 70 at its uppermost end.

A hanger 72 swingably carries the lowermost end of screen 70, while a crank shaft 74 is operatively connected to the other end of screen 70 so that the same may be driven to and fro through substantially longitudinal paths.

Primary screen 58 is driven by motor 12 through the medium of pulley 44 mounted on shaft 38, pulley 76 mounted on crank shaft 74, pulley 78 mounted on crank shaft 62, and belts 46, 80 and 82, all of which serve to transmit power from motor 12.

A chute 84 below the major portion of second screen 70 receives the very small particles of shells kernels and foreign matter for conveyance to a remote point where it may be handled or disposed of as desired.

The lowermost end of screen 70 rides above a receiver 86, the lower end of which is above conveyor belt 88. The lowermost end of primary screen 58 reciprocates above the mouth of a shattering device 90 that is in the nature of a conventional hammer mill, the beater 92 of which is formed as detailed in Fig. 6. Screen 94 in this shattering device 90, has openings substantially the same as openings in foraminous bottom 66, and when the parts of the nuts which have passed into this device are broken to a size where they will pass through this screen, they will fall upon the uppermost end of screen 70.

Beater 92 of device 90 is mounted upon shaft 96 which carries pulley 98. A belt 100 passes over pulley 98 on shaft 96 and pulley 102 on motor shaft 50 to drive beater 92. Continuous conveyor belt 88 passes over rollers 104 at each end respectively thereof, and is driven slowly by belt 106 that passes over pulleys 108 and 110 respectively.

The latter pulley is on shaft 112 with a relatively large wheel 114 over which passes belt 116. A series of pulleys 118 on shaft 74 permits adjusting belt 116 to positions where belt 88 may be driven at desired speeds.

Another conveyor belt 120, shorter than belt 88, terminates above hopper 122 into which salable kernels of the nuts are deposited. The disposition of two belts as illustrated, permits operators, along each side thereof, to sort the kernels from all the parts on belt 88 and place them upon belt 120 for trnasportation to this hopper 122.

Shell crushing means, such as illustrated in Figs. 7 and 8, may be used in lieu of that shown in Figs. 1, 2 and 3, for example. In this form of the invention, a pair of crushing wheels 200, each provided with a series of peripheral cavities 202, are mounted in side-by-side relation upon vertical shafts 204, one of which is extended for connection to a means for driving the same. Meshing gear 206 keyed or otherwise secured to shafts 204, insure the simultaneous rotation of crushing wheels 200 which are likewise keyed to these shafts above a conveyor belt 208 on which nuts 210 are deposited by the operator.

Indicating marks 212 or other elements formed on belt 208 to insure proper spacing of nuts 210, makes the operation of this type of crusher practical, for as the nuts are moved by belt 208, they will enter opposed cavities 202 and be crushed thereby.

The operation of the nut cracking apparatus shown in the preferred and modified form is obvious to one skilled in the art. It is plain to see that as nuts are dropped into screen 58, the parts thereof above a predetermined size, will be moved into device 90, while parts below predetermined size will pass through foraminous bottom 66 of screen 58 into member 64. After the relatively large parts of the nuts are treated in shattering device 90 to a degree where they will pass through the openings in screen 94, they will be deposited upon screen 70 through which will pass the matter that cannot be manually handled by the sorters along belts 88 and 120. This fine material will pass out through chute 84, while the kernels and larger parts of the shells will be deposited upon belt 88 by receiver 86. The kernels are removed from belt 88 and placed upon belt 120 by the operators, and shells and other matter remaining upon belt 88 will be dumped therefrom to be handled as desired. Thus, large kernels that are commercially valuable are quickly and easily obtained through a minimum amount of labor and the apparatus herein described is utilized to eliminate a major portion of the waste products incident to the handling of nuts.

Having thus described the invention, what is claimed as new and desired to be secured by Letters Patent is:

1. In nut cracking apparatus, the combination of means for crushing the shell of the nut being cracked; a primary inclined, reciprocable screen disposed to catch the parts of the crushed nuts and separate therefrom pieces below a certain predetermined size; a second inclined reciprocable screen positioned below the primary screen; means for catching said pieces below a certain predetermined size as they fall through the primary screen; a device for receiving pieces of the nuts above said size from the primary screen to further shatter the same; and means for reciprocating both screens, said catching means and the device being arranged to deposit the nut pieces therefrom on the second screen at the uppermost portion thereof, said device for shattering the nut parts delivered thereto having a screen provided with openings of a size equal to the openings in the primary screen.

2. In nut cracking apparatus, the combination of means for crushing the shell of the nut being cracked; a primary inclined, reciprocable screen disposed to catch the parts of the crushed nuts and separate therefrom pieces below a certain predetermined size; a second inclined reciprocable screen positioned below the primary screen; means for catching said pieces below a certain predetermined size as they fall through the primary screen; a device for receiving pieces of the nuts above said size from the primary screen to further shatter the same; and means for reciprocating both screens, said catching means and the device being arranged to deposit the nut pieces therefrom on the second screen at the uppermost portion thereof, said device for shattering the nut parts delivered thereto having a screen provided with openings of a size equal to the openings in the primary screen, the openings of the second screen being smaller than the openings of either the primary screen or the screen in the shattering device.

3. In nut cracking apparatus, the combination of means for crushing the shell of the nut being cracked; a primary inclined, reciprocable screen disposed to catch the parts of the crushed nuts and separate therefrom pieces below a certain predetermined size; a second inclined reciprocable screen positioned below the primary screen; means for catching said pieces below a certain predetermined size as they fall through the primary screen; a device for receiving pieces of the nuts above said size from the primary screen to further shatter the same; and means for reciprocating both screens, said catching means and the device being arranged to deposit the nut pieces therefrom on the second screen at the uppermost portion thereof, said device for shattering the nut parts delivered thereto having a screen provided with openings of a size equal to the openings in the primary screen, the openings of the second screen being smaller than the openings of either the primary screen or the screen in the shattering device, said second screen having a receiver at the lowermost end thereof for collecting parts of the nuts incapable of passing through said screen and means below the remaining portion of the second screen for collecting parts of the nuts capable of passing through the said second screen.

JAMES B. WALKER.